United States Patent
Okada et al.

(10) Patent No.: US 9,776,461 B2
(45) Date of Patent: Oct. 3, 2017

(54) TIRE INFLATION PRESSURE DETECTION DEVICE

(71) Applicant: DENSO CORPORATION, Kariya, Aichi-pref. (JP)

(72) Inventors: Noriaki Okada, Kariya (JP); Nobuya Watabe, Kariya (JP); Masashi Mori, Kariya (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 0 days.

(21) Appl. No.: 14/908,389

(22) PCT Filed: Jun. 16, 2014

(86) PCT No.: PCT/JP2014/003180
§ 371 (c)(1),
(2) Date: Jan. 28, 2016

(87) PCT Pub. No.: WO2015/015692
PCT Pub. Date: Feb. 5, 2015

(65) Prior Publication Data
US 2016/0167459 A1   Jun. 16, 2016

(30) Foreign Application Priority Data

Jul. 31, 2013  (JP) .................................. 2013-159439
May 14, 2014 (JP) .................................. 2014-100691

(51) Int. Cl.
*B60C 23/04* (2006.01)
*G01L 17/00* (2006.01)

(52) U.S. Cl.
CPC ...... *B60C 23/0445* (2013.01); *B60C 23/0455* (2013.01); *B60C 23/0462* (2013.01); *G01L 17/00* (2013.01)

(58) Field of Classification Search
CPC . G01L 17/00; B60C 23/0474; B60C 23/0408; B60C 23/0484; B60C 23/02
See application file for complete search history.

(56) References Cited

U.S. PATENT DOCUMENTS

2002/0101341 A1* 8/2002 Yamagiwa .......... B60C 23/0408
340/447
2003/0110851 A1  6/2003 Tsujita
(Continued)

FOREIGN PATENT DOCUMENTS

CN          1502488 A       6/2004
CN        102481816 A       5/2012
(Continued)

OTHER PUBLICATIONS

International Search Report and Written Opinion (in Japanese with English Translation) for PCT/JP2014/003180, mailed Sep. 9, 2014; ISA/JP.

*Primary Examiner* — Mirza Alam
(74) *Attorney, Agent, or Firm* — Harness, Dickey & Pierce, P.L.C.

(57) ABSTRACT

In a tire inflation pressure detection device, a receiver functions such that, when an ignition switch is on, power is generated by a power supply controller to set the power supply state of the receiver to one in which frame reception is enabled to detect the inflation pressure of a tire, and such that, when the IG is off, in each predetermined intermittent cycle power is generated by the power supply controller to set the power supply state of the receiver to one in which frame reception is enabled to detect the inflation pressure of the tire. A transmitter determines whether a decrease in tire inflation pressure occurs, and when the decrease occurs, the transmitter transmits frames more frequently than before the occurrence of the decrease in tire inflation pressure at a (Continued)

shorter frame transmission time interval than a regular transmission cycle during a high-frequency transmission period.

6 Claims, 8 Drawing Sheets

(56) References Cited

U.S. PATENT DOCUMENTS

| | | | | |
|---|---|---|---|---|
| 2003/0156021 A1* | 8/2003 | Tabata | ............... | B60C 23/0416 340/442 |
| 2005/0017860 A1* | 1/2005 | Tsuji | ................. | B60C 23/0466 340/442 |
| 2007/0252685 A1* | 11/2007 | Oda | .................... | B60C 23/0408 340/447 |
| 2012/0044064 A1* | 2/2012 | Maekawa | ........... | B60C 23/0408 340/447 |

FOREIGN PATENT DOCUMENTS

| | | | |
|---|---|---|---|
| JP | 2001246914 | A | 9/2001 |
| JP | 2003182325 | A | 7/2003 |
| JP | 2003237326 | A | 8/2003 |
| JP | 2005212791 | A | 8/2005 |
| JP | 2013006588 | A | 1/2013 |

* cited by examiner

TIRE INFLATION PRESSURE DETECTION DEVICE

CROSS REFERENCE TO RELATED APPLICATIONS

This application is a U.S. National Phase Application under 35 U.S.C. 371 of International Application No. PCT/JP2014/003180 filed on Jun. 16, 2014 and published in Japanese as WO 2015/015692 A1 on Feb. 5, 2015. This application is based on and claims the benefit of priority from Japanese Patent Application No. 2013-159439 filed on Jul. 31, 2013 and Japanese Patent Application No. 2014-100691 filed on May 14, 2014. The entire disclosures of all of the above applications are incorporated herein by reference.

TECHNICAL FIELD

The present disclosure relates to a direct tire inflation pressure detection device.

BACKGROUND ART

A direct tire inflation pressure detection device is one type of tire inflation pressure detection device in the related art. The direct tire inflation pressure detection device is formed by directly attaching transmitters each including a sensor, such as a pressure sensor, to tired-wheels side and attaching an antenna and a receiver to a vehicle body side. The tire inflation pressure detection device performs a tire inflation pressure detection when the transmitters transmit detection results of the pressure sensors and the receiver receives the detection results via the antenna.

Because it is not preferable to run a vehicle with tires at a low tire inflation pressure, it is required for the tire inflation pressure detection device as above to promptly notify a driver of a decrease of the tire inflation pressure.

PRIOR ART LITERATURES

Patent Literature

Patent Literature 1: JP-2013-6588-A

SUMMARY OF INVENTION

However, because the tire inflation pressure detection device is a system that performs a tire inflation pressure detection while an ignition switch (hereinafter, abbreviated to IG) is ON, a decrease of the tire inflation pressure is detected only after an analysis is made on the detection results of the pressure sensors, which are transmitted from the transmitters after the IG is turned ON. It thus takes a few minutes to detect and notify a decrease of the tire inflation pressure. Hence, the driver may start running the vehicle without being aware of a decrease of the tire inflation pressure while the vehicle is stopped or may become aware of a decrease of the tire inflation pressure while the vehicle is stopped a few minutes later.

Meanwhile, a state of the IG is unknown to the transmitters, because the transmitters are provided to the respective wheels and operated independently of the receiver provided to the vehicle body side. Accordingly, the transmitters perform a pressure detection while the vehicle is stopped. Assume that the system continues a tire inflation pressure detection while the IG is OFF, the driver may be notified of a decrease of the tire inflation pressure promptly when the IG is turned ON. However, by merely configuring the system to perform a tire inflation pressure detection while the IG is OFF and while the IG is ON in the same manner, a dark current while the vehicle is stopped (current consumed while the vehicle is stopped) increases markedly and the battery runs out. The system as above is therefore practically infeasible.

The present disclosure has an object to provide a tire inflation pressure detection device not only capable of notifying a driver of a decrease of a tire inflation pressure more promptly when an IG is turned ON, but also capable of restricting an increase of a dark current while a vehicle is stopped.

In a tire inflation pressure detection device according to one aspect of the present disclosure, a receiver operates on a supply of power from a battery and detects a tire inflation pressure while an IG is ON by generating a power supply to enable a reception of frames at a radio receptor using a power-supply controller to change a power-supply state of the receiver to a state in which the receiver is capable of receiving the frames, and detects a tire inflation pressure while the IG is OFF by generating the power supply to enable the reception of the frames at the radio receptor using the power-supply control portion in every predetermined intermittent cycle to change the power-supply state of the receiver to the state in which the receiver is capable of receiving the frames. At least one transmitter determines whether a decrease of the tire inflation pressure is occurring based on a detection signal of a sensor, and transmits, at the occurrence of a decrease of the tire inflation pressure, the frames at a frame transmission interval shorter than a regular transmission cycle during a high-frequency transmission zone set to be as long as or longer than the intermittent cycle at a frequency higher than a frequency before the occurrence of a decrease of the tire inflation pressure.

Owing to the configuration as above, the receiver becomes capable of receiving the frames in every intermittent cycle even while the IG is OFF. Upon detection of the occurrence of a decrease of the tire inflation pressure, the transmitter transmits the frames in succession at a short frame transmission interval during the emergency transmission period, which is a period longer than the intermittent cycle, at a high frequency. Hence, even when the transmitter detects the occurrence of a decrease of the tire inflation pressure while the IG is OFF, the frames can be received at the receiver in a reliable manner and a warning on the occurrence of a decrease of the tire inflation pressure can be given to a driver more promptly when the IG is turned ON.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
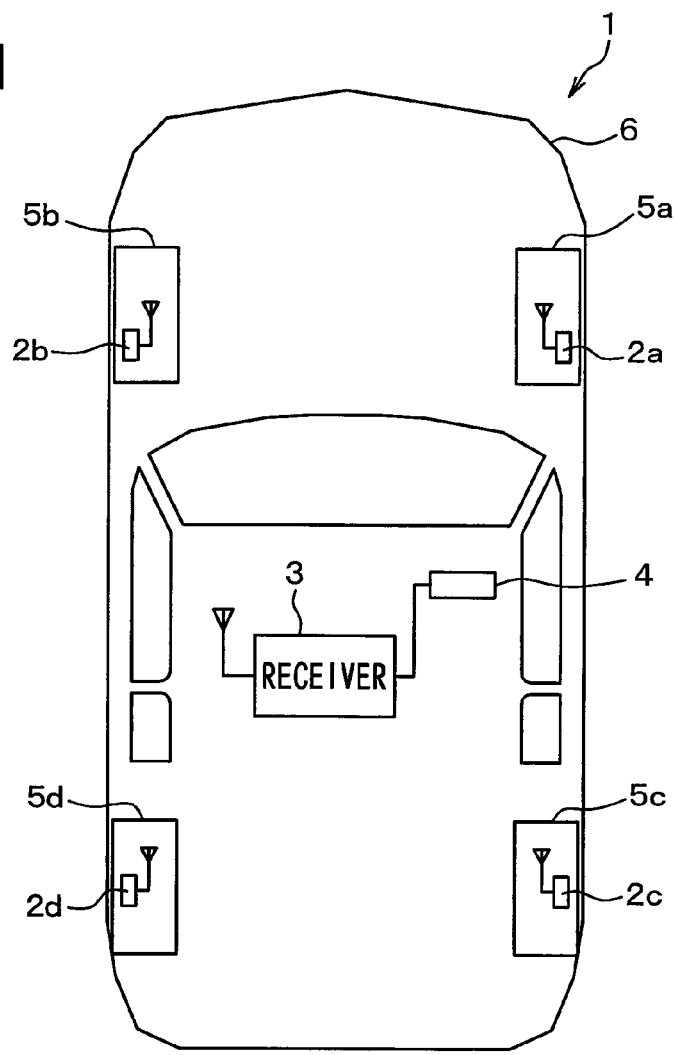
FIG. 1 is a view of an overall configuration of a tire inflation pressure detection device according to a first embodiment of the present disclosure.

Hereinafter, embodiments of the present disclosure will be described according to the drawings. In the respective embodiments, a description will be given by labeling same or equivalent portions with same reference numerals.

First Embodiment

A first embodiment of the present disclosure will be described with reference to FIG. 1 through FIG. 5. In FIG. 1, an upper side of the sheet surface is a front side of a vehicle 1, a lower side of the sheet surface is a rear side of the vehicle 1, and a right-left direction of the sheet surface is a right-left direction of the vehicle.

A tire inflation pressure detection device shown in FIG. 1 is attached to the vehicle 1 and formed of transmitters 2a through 2d, a receiver 3, and an indicator 4.

As is shown in FIG. 1, the transmitters 2a through 2d are attached, respectively, to wheels 5a through 5d of the vehicle 1, and detect air pressures of tires attached to the wheels 5a through 5d. The transmitters 2a through 2d also store data of detection signals indicting detection results into frames and transmit the frames. The receiver 3 is attached to a vehicle body 6 of the vehicle 1, and receives the frames transmitted from the transmitters 2a through 2d and also detects tire inflation pressures by performing various types of processing and computations based on the detection signals stored in the frames.

Figure 2:
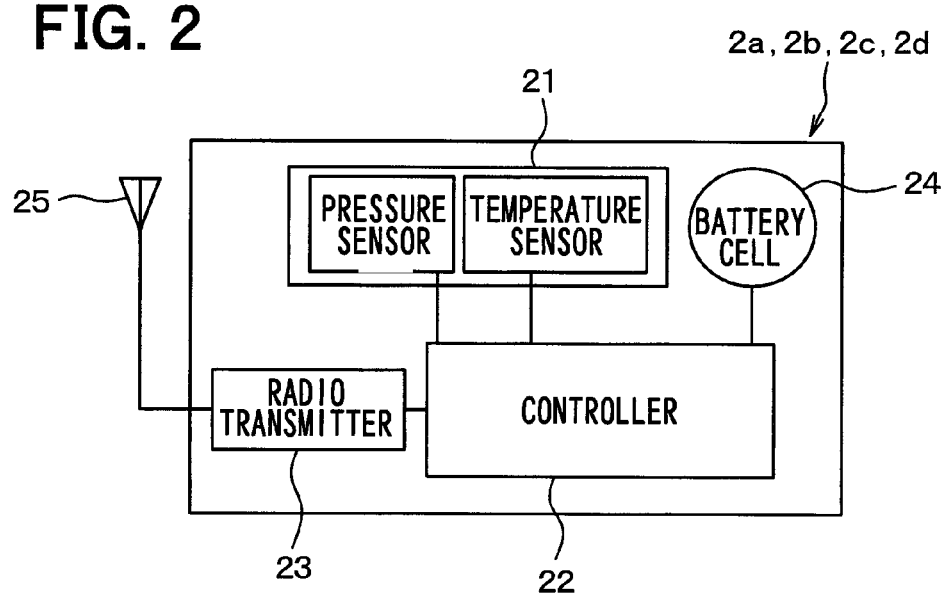
FIG. 2 is a common block diagram of transmitters 2a through 2d in detail.

As is shown in FIG. 2, each of the transmitters 2a through 2d includes a sensor 21, a controller (first controller) 22, a radio transmitter 23, a battery cell 24, and an antenna 25. Each portion is driven by a supply of power from the battery cell 24.

The sensor 21 includes, for example, a diaphragm pressure sensor and a temperature sensor, and outputs a detection signal corresponding to a tire inflation pressure and a detection signal corresponding to a tire internal temperature to the controller 22.

The controller 22 is formed of a known microcomputer including a CPU, a ROM, a RAM, an I/O, and so on, and performs predetermined processing in accordance with a program stored in a memory, such as the ROM. The internal memories of the controller 22 store ID information including transmitter-specific identification information to identify the respective transmitters 2a through 2d and vehicle-specific identification information to identify an own vehicle.

The controller 22 receives the detection signals outputted from the sensor 21 and applies signal processing to the detection signals and processes the detection signals as needed to form data indicating a detection result. The controller 22 stores the data into frames with own ID information identifying itself as the transmitter 2a, 2b, 2c, or 2d, and sends the frames to the radio transmitter 23. The controller 22 makes a determination on a decrease of the tire inflation pressure by itself. The controller 22 therefore also stores data indicating whether a decrease of the tire inflation pressure is occurring into the frames and sends the frames to the radio transmitter 23. For example, the controller 22 compares a tire inflation pressure converted to a tire inflation pressure at a predetermined reference temperature with a predetermined warning threshold Th. Upon detection of a decrease of the tire inflation pressure to or below the warning threshold Th, the controller 22 stores the data indicating the occurrence of a decrease of the tire inflation pressure into the frames. In the description below, data indicating the detection results of the tire inflation pressure and the tire internal temperature and data indicating whether a decrease of the tire inflation pressure is occurring are referred to as data relating to the tire inflation pressure. It should be appreciated, however, that the data relating to the tire inflation pressure does not necessarily contain all of the data specified above, and may contain only one of the data indicating the detection results of the tire inflation pressure and the tire internal temperature and the data indicating whether a decrease of the tire inflation pressure is occurring.

The radio transmitter 23 functions as an output portion that outputs frames sent from the controller 22 to the receiver 3 in the form of an RF wave via the antenna 25. It is set to perform processing to send a signal from the controller 22 to the radio transmitter 23 in every predetermined transmission cycle in accordance with the program. In other words, because whether an IG is ON or OFF cannot be determined on the side of the transmitters 2a through 2d, it is configured in such a manner that frames are basically transmitted in every predetermined regular transmission cycle and frames are transmitted at a frame transmission interval shorter than the regular transmission cycle at the occurrence of a decrease of the tire inflation pressure.

The controller 22 adjusts transmission timing to prevent the frames from being transmitted from the respective transmitters 2a through 2d at the same timing. However, by merely storing different transmission timings into the controllers 22 of the respective transmitters 2a through 2d for the frames to be transmitted at different timings from the respective transmitters 2a through 2d attached to the wheels 5a through 5d, respectively, the respective transmitters 2a through 2d store contents different from one another. In order to eliminate such an inconvenience, the program stored in the controller 22 is set, for example, to change the transmission timing randomly each time. Consequently, the program in the controller 22 is common in all the transmitters 2a through 2d.

The battery cell 24 supplies power to the sensor 21 and the controller 22. Upon supply of power from the battery cell 24, the sensor 21 acquires the data relating to the tire inflation pressure and the controller 22 performs various computations.

The transmitters 2a through 2d configured as above are attached to wheel air-injection valves of the wheels 5a through 5d, respectively, and disposed in such a manner that the sensors 21 are exposed to an inner side of the tires. Consequently, the transmitters 2a through 2d detect tire inflation pressures of the corresponding wheels and transmit the frames in every predetermined cycle via the antennas 25 provided to the respective transmitters 2a through 2d.

Figure 3:
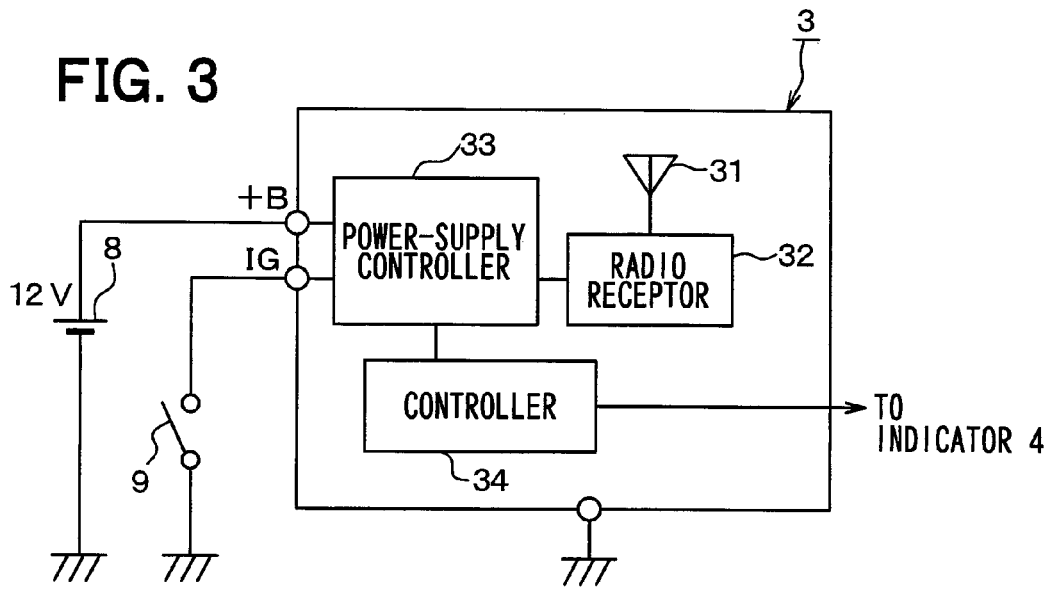
FIG. 3 is a block diagram of a receiver 3 in detail.

Also, as is shown in FIG. 3, the receiver 3 is formed of an antenna 31, a radio receptor 32, a power-supply controller 33, and a controller 34.

The antenna 31 receives the frames sent from the respective transmitters 2a through 2d. In the present embodiment, the antenna 31 is a single common antenna that collectively receives the frames sent from the respective transmitters 2a through 2d, and fixed to the vehicle body 6.

The radio receptor 32 functions as an input portion that inputs the frames transmitted from the respective transmitters 2a through 2d and received at the antenna 31 and sends the frames to the controller 34.

The power-supply controller 33 performs a power-supply control to supply a drive power supply to the respective portions forming the receiver 3 using a supply of power from a battery 8, more specifically, a predetermined voltage (+B) applied from the battery 8. The receiver 3 operates under the power-supply control by the power-supply controller 33 to receive the frames via the antenna 31 and perform a tire inflation pressure detection using the controller 34. The power-supply controller 33 generates the drive power supply according to, for example, a control signal from the controller 34. Basically, the power-supply controller 33 is kept OFF while an IG 9 is OFF and does not generate the drive power supply whereas the power-supply controller 33 is kept ON while the IG 9 is ON and generates the drive power supply. It should be noted, however, that the power-supply controller 33 is turned ON according to control signals sent from the controller 34 in every predetermined intermittent cycle even while the IG 9 is OFF and generates the drive power supply. Hence, even while the IG 9 is OFF, the transmitter 3 becomes capable of receiving the frames via the antenna 31 in every predetermined intermittent cycle and performing a tire inflation pressure detection using the controller 34.

The controller (second controller) 34 is formed of a known microcomputer including a CPU, a ROM, a RAM, an I/O, and so on, and performs various types of processing relating to a tire inflation pressure detection in accordance with a program stored in the ROM or the like. While the IG 9 is OFF, the controller 34 basically outputs a control signal to the power-supply controller 33 to switch a power-supply state of the receiver 3 to an OFF state (sleep mode). While the IG 9 is ON, the controller 34 basically outputs a control signal to the power-supply controller 33 to switch the power-supply state of the receiver 3 to an ON state. Accordingly, the drive power supply is not generated in the power-supply controller 33 while the IG 9 is OFF. Hence, the frames are not received at the radio receptor 32 and the various types of processing relating to a tire inflation pressure detection are not performed in the controller 34 by itself. When the IG 9 is turned ON, the drive power supply is generated in the power-supply controller 33 and the frames are received at the radio receptor 32 and various types of processing relating to a tire inflation pressure detection are performed in the controller 34 by itself. Owing to the configuration as above, a dark current while the IG 9 is OFF, that is, while the engine is OFF, can be restricted.

It should be noted, however, that the controller 34 is activated in every predetermined cycle even while the IG 9 is OFF, and outputs a control signal to switch ON the power-supply controller 33 to change the power-supply state of the receiver 3 to an ON state (wakeup mode). Herein, the drive power supply is generated in the power-supply controller 33 even while the IG 9 is OFF, and therefore the frames are received at the radio receptor 32 and various types of processing relating to a tire inflation pressure detection are performed in the controller 34 by itself.

For example, as various types of processing relating to a tire inflation pressure detection, the controller 34 finds a tire pressure by performing various types of signal processing and computations based on the data relating to the tire inflation pressure stored in the frames received from the radio receptor 32. The controller 34 outputs an electric signal corresponding to the found tire inflation pressure to the indicator 4. For example, the controller 34 compares the found tire inflation pressure with the predetermined warning threshold Th. Upon detection of a decrease of the tire inflation pressure to or below the predetermined warning threshold Th, the controller 34 outputs a signal informing such a decrease of the tire inflation pressure to the indicator 4. In the case of the present embodiment, a tire inflation pressure detection is performed also in the transmitters 2a through 2d. Hence, in a case where the data relating to the tire inflation pressure stored in the received frames contains data indicating the occurrence a decrease of the tire inflation pressure, the controller 34 may output a signal indicating the occurrence of a decrease of the tire inflation pressure to the indicator 4.

Alternatively, the controller 34 may find the tire inflation pressures of the respective four wheels 5a through 5d and output the tire inflation pressures to the indicator 4 in connection with the respective wheels 5a through 5d. The ID information of the transmitters 2a through 2d disposed, respectively, to the wheels 5a through 5d is stored in the memory of the controller 34 in connection with locations of the respective wheels 5a through 5d. Hence, the controller 34 is capable of identifying which of the received frames is sent from which of the receivers 2a through 2d attached, respectively, to the wheels 5a through 5d by checking the matching with the ID information stored in the frames, and is therefore capable of identifying the wheel with the tire at a decreased tire inflation pressure. Accordingly, at the occurrence of a decrease of the tire inflation pressure, the controller 34 identifies the wheel with the tire at a decreased tire inflation pressure and outputs the identified wheel to the indicator 4. Alternatively, it may be configured in such a manner that the controller 34 outputs the found tire inflation pressures to the indicator 4 in connection with the respective wheels 5a through 5d even when a decrease of the tire inflation pressure is not occurring.

In the manner as described above, a decrease of the tire inflation pressure in any one of the four wheels 5a through 5d or the tire inflation pressures of the respective four wheels 5a through 5d are sent to the indicator 4.

As is shown in FIG. 1, the indicator 4 is disposed in a place where the indicator 4 is visually recognizable by the driver, and is formed of, for example, a warning lamp or a display disposed within an instrument panel of the vehicle 1. The indicator 4 displays a sign or the like informing the occurrence of a decrease of the tire inflation pressure when a signal informing the occurrence of a decrease of the tire inflation pressure is sent from the controller 34 of the receiver 3, and thereby notifies the driver of a decrease of the tire inflation pressure. Alternatively, when the tire inflation pressures of the respective four wheels 5*a* through 5*d* are transmitted from the receiver 3, the indicator 4 may display all the tire inflation pressures in connection with the respective wheels 5*a* through 5*d*.

In the present embodiment, the indicator 4 is used as warning means for giving a warning to the driver. It should be appreciated, however, that the warning means may be a speaker or the like that gives a warning by sounds instead of the indicator 4 that gives a warning visually.

The tire inflation pressure detection device of the present embodiment is formed as above. An operation of the tire inflation pressure detection device of the present embodiment will now be described.

A fundamental operation of the tire inflation pressure detection device will be described first. In the tire inflation pressure detection device, each of the transmitters 2*a* through 2*d* detects a tire inflation pressure and a tire internal temperature in every predetermined sensing cycle using the sensor 21, and stores the detection result and the own ID information into frames and transmits the frames in every predetermined regular transmission cycle using the controller 22. Because it is unknown whether the IG 9 is turned ON on the side of the transmitters 2*a* through 2*d*, the processing as above is performed independently of whether the IG 9 is ON or OFF.

On the other hand, the receiver 3 generates the drive power supply using the power-supply controller 33 when the IG 9 is turned ON for the controller 34 and the radio receptor 32 to operate upon supply of the power. The receiver 3 is thus changed to a reception stand-by state in which the receiver 3 is capable of receiving the frames. When the frames are transmitted from the transmitters 2*a* through 2*d* while the receiver 3 is in the reception stand-by state, the receiver 3 receives the frames and performs a tire inflation pressure detection. Accordingly, by transmitting a result of the tire inflation pressure detection to the indicator 4, the tire inflation pressure at the time of transmission is displayed or a sign notifying the occurrence of a decrease of the tire inflation pressure is displayed. The driver is thus notified of a tire inflation pressure status.

Normally, the operation as above is performed. In the present embodiment, however, the operation as follows is also performed in order not only to notify the driver of a decrease of the tire inflation pressure more promptly when the IG 9 is turned ON, but also to restrict an increase of the dark current while the vehicle is stopped.

Figure 4:
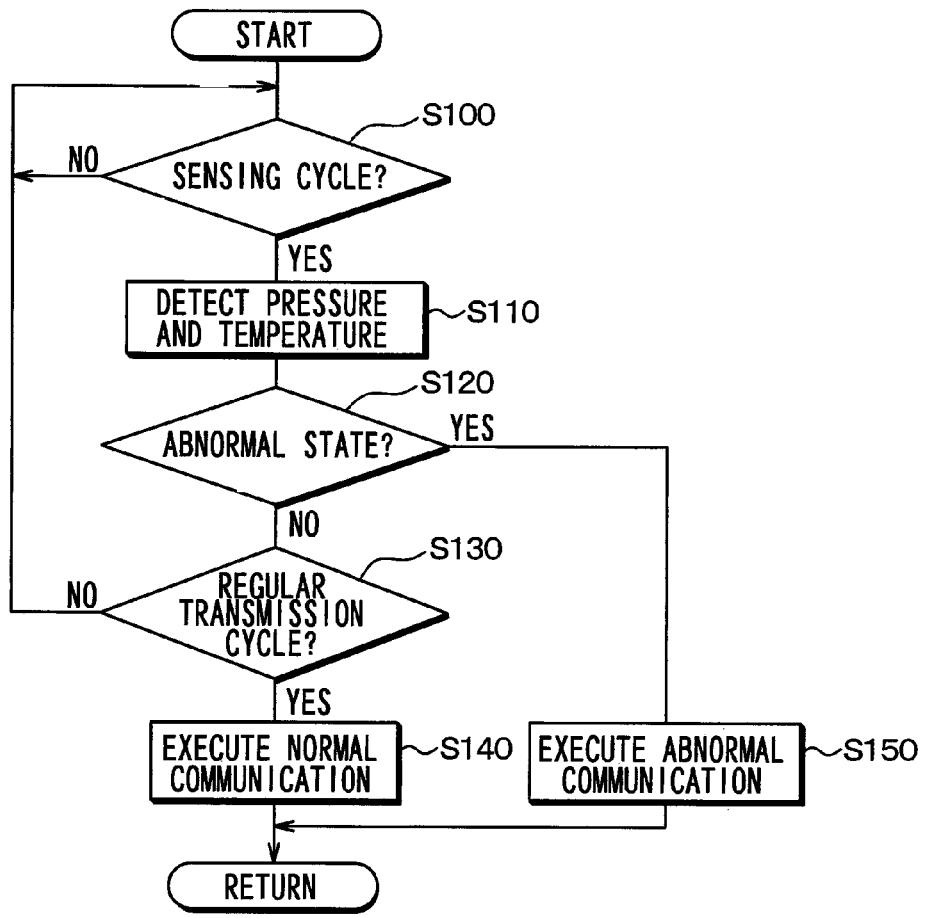
FIG. 4 is a flowchart depicting frame transmission processing performed by controllers 22 of the respective transmitters 2a through 2d in detail.

That is, the transmitters 2*a* through 2*d* make a determination on the occurrence of a decrease of the tire inflation pressure by themselves. At the occurrence of a decrease of the tire inflation pressure, the transmitters 2*a* through 2*d* transmit the frames in which the data relating to the tire inflation pressure is stored at a high frequency in transmission cycles shorter than the cycles of the regular transmission. For example, the transmitters 2*a* through 2*d* perform processing in accordance with the flowchart of FIG. 4. The processing depicted in FIG. 4 is performed in the controller 22 in every predetermined control cycle.

Firstly in Step 100, a determination is made as to whether it is the sensing cycle. Processing in Step 110 and subsequent steps is performed after a stand-by until the sensing cycle. In Step 110, the tire inflation pressure and the tire internal temperature are detected and a tire inflation pressure converted to a tire inflation pressure at a predetermined reference temperature is computed using the detection result.

In subsequent Step 120, a determination is made as to whether it is an abnormal state. The abnormal state referred to herein basically means a decrease of the tire inflation pressure. However, the abnormal state herein includes a case where the tire inflation pressure is exceedingly high. For example, it is determined that a decrease of the tire inflation pressure is occurring when the tire inflation pressure has decreased by a predetermined amount (for example, 20 kPa) or more within a predetermined time or when a current tire inflation pressure has decreased from a recommended tire inflation pressure by a predetermined ratio (for example, 25%) or more. Also, it is determined that the tire inflation pressure has increased exceedingly when the current tire inflation pressure is at a value higher than the recommended tire inflation pressure by a predetermined ratio (for example, 25%) or more. In a case where such an abnormal state is not occurring, advancement is made to Step 130, in which a determination is made as to whether it is the regular transmission cycle. When it is the regular transmission cycle, advancement is made to Step 140, in which the frames are transmitted as a normal regular transmission. In the event of the abnormal state as above, advancement is made to Step 150, in which the frame transmission frequency is increased by transmitting the frames in short transmission cycles as an abnormal-time transmission. In the manner as above, the transmitters 2*a* through 2*d* transmit the frames as the normal regular transmission in the absence of the abnormal state and as the abnormal-time transmission in the event of the abnormal state independently of whether the IG 9 is ON or OFF.

On the other hand, the receiver 3 operates as described above while the IG 9 is ON. While the IG 9 is OFF, the controller 34 activates the power-supply controller 33 in predetermined intermittent cycles so as to generate the drive power supply and hence to change the power-supply state to an ON state. Consequently, the receiver 3 is in the reception stand-by state in which the receiver 3 is capable of receiving the frames for a predetermined period since the activation. The receiver 3 is thus capable of performing a tire inflation pressure detection by receiving the frames transmitted during the predetermined period. When the occurrence of a decrease of the tire inflation pressure is confirmed while the IG 9 is OFF, the receiver 3 stores the occurrence of a decrease of the tire inflation pressure and gives a warning on the occurrence of a decrease of the tire inflation pressure via the indicator 4 as soon as the IG 9 is turned ON.

When the operations as above are performed, the condition as follows is satisfied. Let T1 be the regular transmission cycle of the transmitters 2*a* through 2*d*, T2 be a reception enable period during which the receiver 3 is in the reception stand-by state while the IG 9 is OFF, and T3 be the intermittent cycle in which the receiver 3 is in a communication stand-by state. Also, let T4 be a high-frequency transmission zone which is a period during which the frames are transmitted at a high frequency at a short transmission interval when the transmitters 2*a* through 2*d* perform the abnormal-time transmission. Then, T1 through T4 satisfy the relations as follows.

That is, the regular transmission cycle T1 is made shorter than the reception enable period T2 (T1<T2), so that the frames transmitted from the transmitters 2*a* through 2*d* can be received at least once during the reception enable period T2. The intermittent cycle T3 can be set to an arbitrary interval longer than the reception enable period T2. However, the intermittent cycle T3 is set to a cycle for which a reduction of the dark current is taken into consideration. The high-frequency transmission zone T4 is set to a period longer than the intermittent cycle T3 (T3<T4) for the high-frequency transmission zone T4 to overlap any one of the reception enable periods T2 in terms of time, so that the frames transmitted as the abnormal-time transmission can be received at the receiver 3 in a reliable manner.

Figure 5:
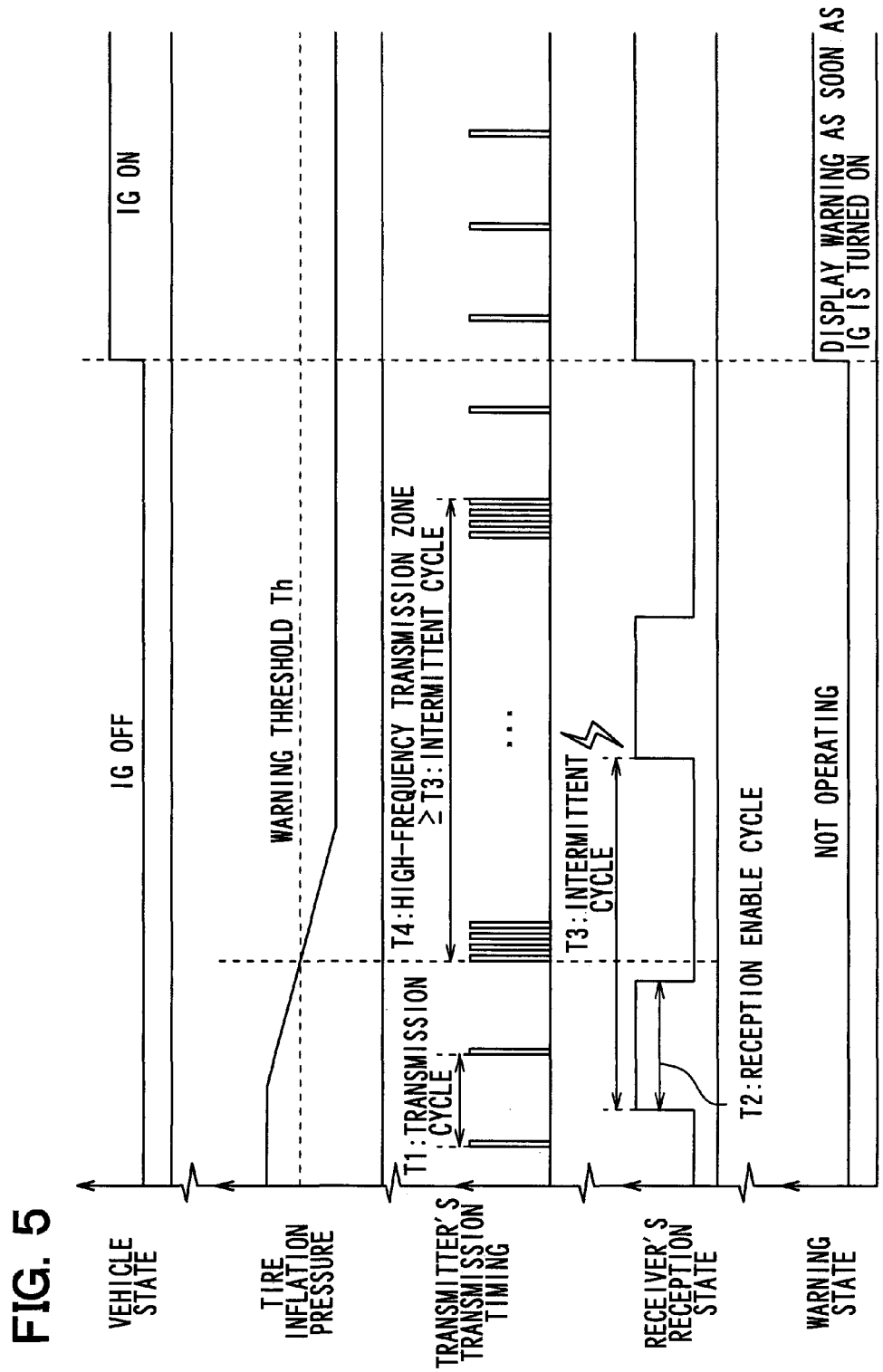
FIG. 5 is a time chart showing a state while an IG 9 is Off and when the IG 9 is switched ON from OFF in a case where a tire inflation pressure detection of the first embodiment is performed.

FIG. 5 shows a state when the operation as above is performed. As is shown in FIG. 5, while the IG 9 is OFF, the frames are transmitted from the transmitters 2a through 2d in every regular transmission cycle T1, and the receiver 3 is activated in every intermittent cycle T3 and becomes capable of receiving the frames during the reception enable period T2. Herein, because the regular transmission cycle T1 is made shorter than the reception enable period T2, the frames can be received during the reception enable period T2 in a reliable manner.

When the tire inflation pressure decreases to the warning threshold Th, the transmitters 2a through 2d detect the occurrence of a decrease of the tire inflation pressure. Hence, the frames are transmitted at a short frame transmission interval during the high-frequency transmission zone T4 as the abnormal-time transmission. Herein, the high-frequency transmission zone T4 is set to a period longer than the intermittent cycle T3 in which to activate the receiver 3 for the high-frequency transmission zone T4 to overlap the reception enable period T2 in terms of time. Consequently, the frames transmitted during the high-frequency transmission zone T4 are received at the receiver 3 without fail. In the receiver 3, the controller 34 stores the occurrence of a decrease of the tire inflation pressure in the memory.

When the IG 9 is turned ON later and the receiver 3 is activated, the controller 34 transmits a signal informing the occurrence of a decrease of the tire inflation pressure to the indicator 4 according to the stored content on the occurrence of a decrease of the tire inflation pressure, and gives a warning on the occurrence of a decrease of the tire inflation pressure via the indicator 4. Consequently, a warning on the occurrence of a decrease of the tire inflation pressure can be given as soon as the IG 9 is turned ON.

As has been described above, the tire inflation pressure detection device of the present embodiment is configured in such a manner that the frames can be received at the receiver 3 in every intermittent cycle T3 even while the IG 9 is OFF. It is also configured in such a manner that, upon detection of the occurrence of a decrease of the tire inflation pressure, the transmitters 2a through 2d transmit the frames in succession at a short frame transmission interval during the high-frequency transmission zone T4 which is a period longer than the intermittent cycle T3. Hence, even when the occurrence of a decrease of the tire inflation pressure is detected by the transmitters 2a through 2d while the IG 9 is OFF, the frames are received at the receiver 3 in a reliable manner. A warning on the occurrence of a decrease of the tire inflation pressure can be thus given to the driver more promptly when the IG 9 is turned ON.

Second Embodiment

A second embodiment of the present disclosure will be described. In the present embodiment, a shortest period is defined for the reception enable period T2 described in the first embodiment above. Because the rest is the same as the first embodiment above, a description will be given only to a difference from the first embodiment above.

A dark current can be increased by activating a receiver 3 while an IG 9 is OFF. It is therefore preferable to shorten a reception enable period T2 which is a period during which the receiver 3 is activated and becomes capable of receiving frames because the dark current can be reduced. However, by making the reception enable period T2 too short, when transmitters 2a through 2d transmit frames upon detection of the occurrence of a decrease of a tire inflation pressure, the receiver 3 may possibly fail to receive the frames accurately.

Figure 6:
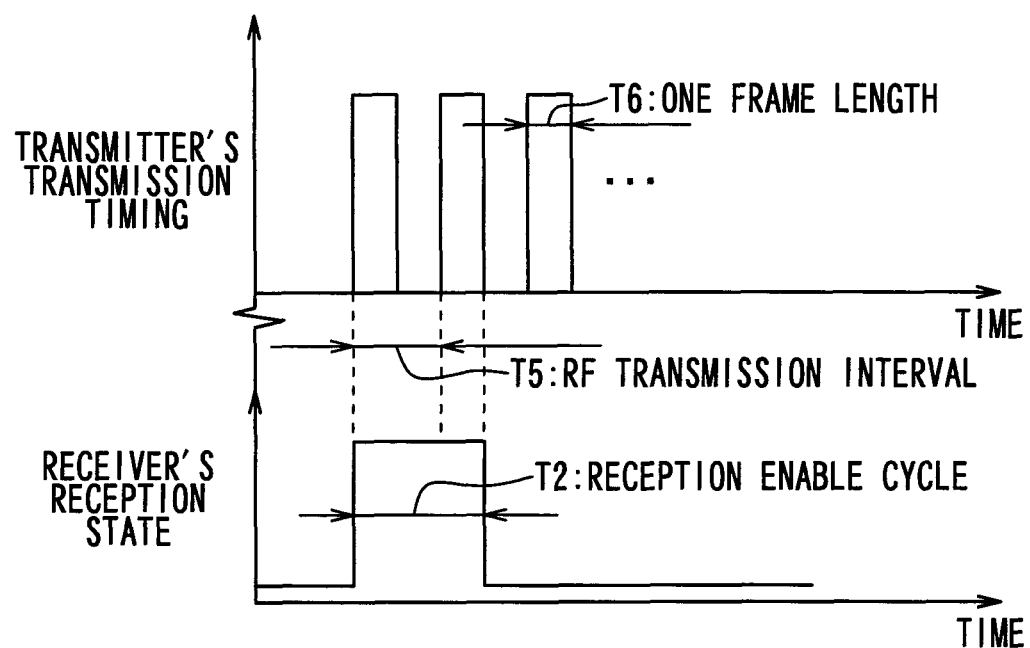
FIG. 6 is a time chart showing relations among a reception enable period T2, a frame transmission interval T5, and a frame length T6 described in a second embodiment of the present disclosure.
Figure 7:
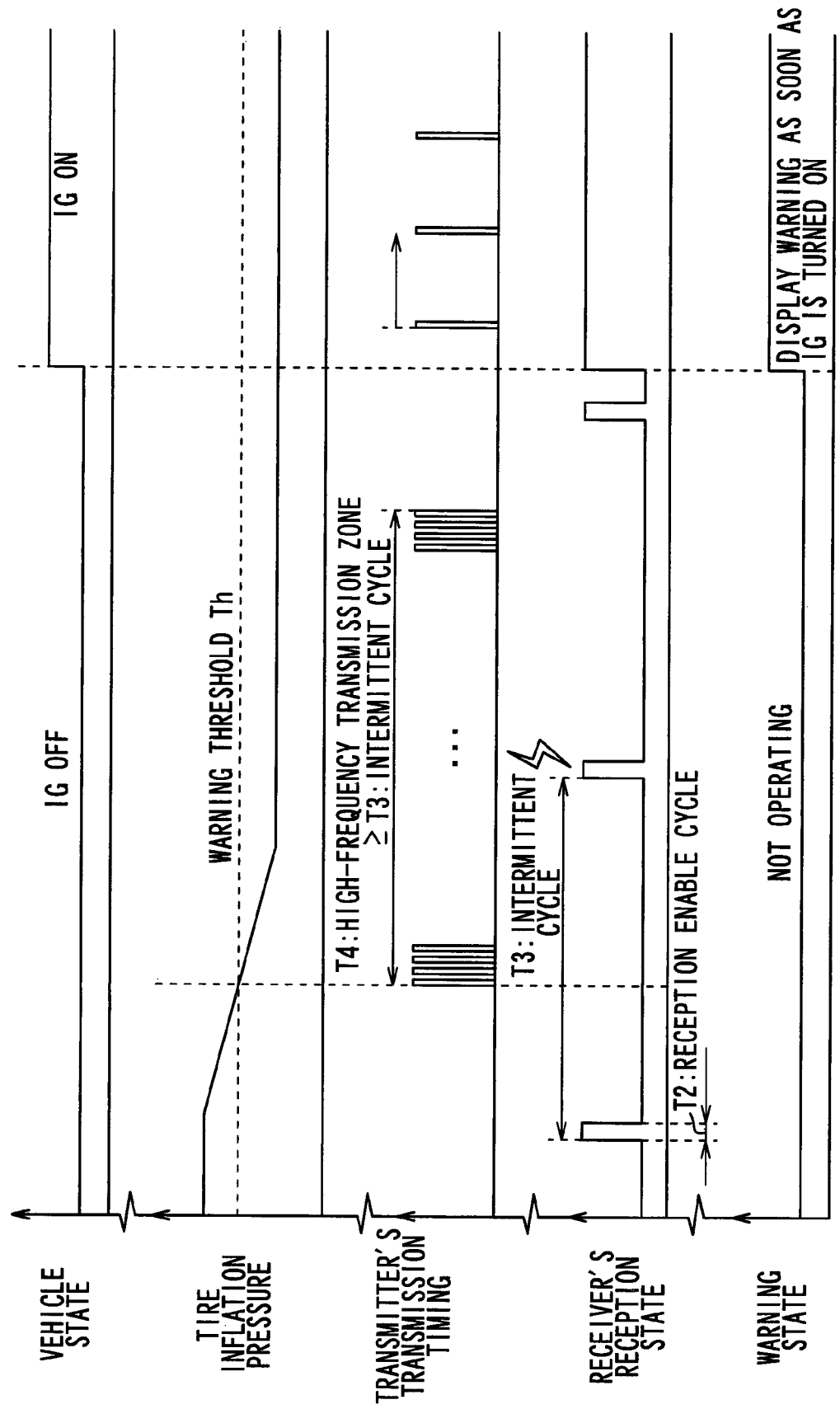
FIG. 7 is a time chart showing a state while an IG 9 is OFF and when the IG 9 is switched ON from OFF in a case where a tire inflation pressure detection of the second embodiment is performed.

In order to eliminate such an inconvenience, the present embodiment is configured so as to set the reception enable period T2 to a time as long as or longer than a frame transmission interval T5 during a high-frequency transmission zone T4 plus a frame length T6 of one frame (T2≥T5+T6). In other words, as is shown in FIG. 6, when the frames having the frame length T6 are transmitted at every predetermined frame transmission interval T5, the entire period of the frame length T6 is contained within the reception enable period T2 at least once without fail by setting the reception enable period T2 to a time as long as or longer the frame transmission interval T5 plus the frame length T6 (T5+T6). Hence, even when the reception enable period T2 is shortened as is shown in FIG. 7, the frames transmitted upon detection of the occurrence of a decrease of the tire inflation pressure by the transmitters 2a through 2d while the IG 9 is OFF can be received at the receiver 3 in a reliable manner.

As has been described, in the present embodiment, the reception enable period T2 is set to a time as long as or longer than the frame transmission interval T5 plus the frame length T6 (T5+T6). Consequently, the occurrence of a decrease of the tire inflation pressure while the IG 9 is OFF can be notified to the receiver 3 in a reliable manner. By making the reception enable period T2 as short as possible (for example, T2=T5+T6) to the extent that the condition, the reception enable period T2 is as long as or longer than the frame transmission interval T5 plus the frame length T6, is satisfied, the dark current while the IG 9 is OFF can be reduced further.

Third Embodiment

A third embodiment of the present disclosure will be described. In the present embodiment, a more preferable period is defined for the reception enable period T2 used in the first embodiment above. Because the rest is the same as the first embodiment above, a description will be given only to a difference from the first embodiment above.

The second embodiment above has described a case where the reception enable period T2 is shortened by giving consideration to a reduction of the dark current while the IG 9 is OFF. However, by making the reception enable period T2 too short, the receiver 3 may possibly fail to receive frames transmitted from the transmitters 2a through 2d when a tire inflation pressure is normal while the IG 9 is OFF.

Figure 8:
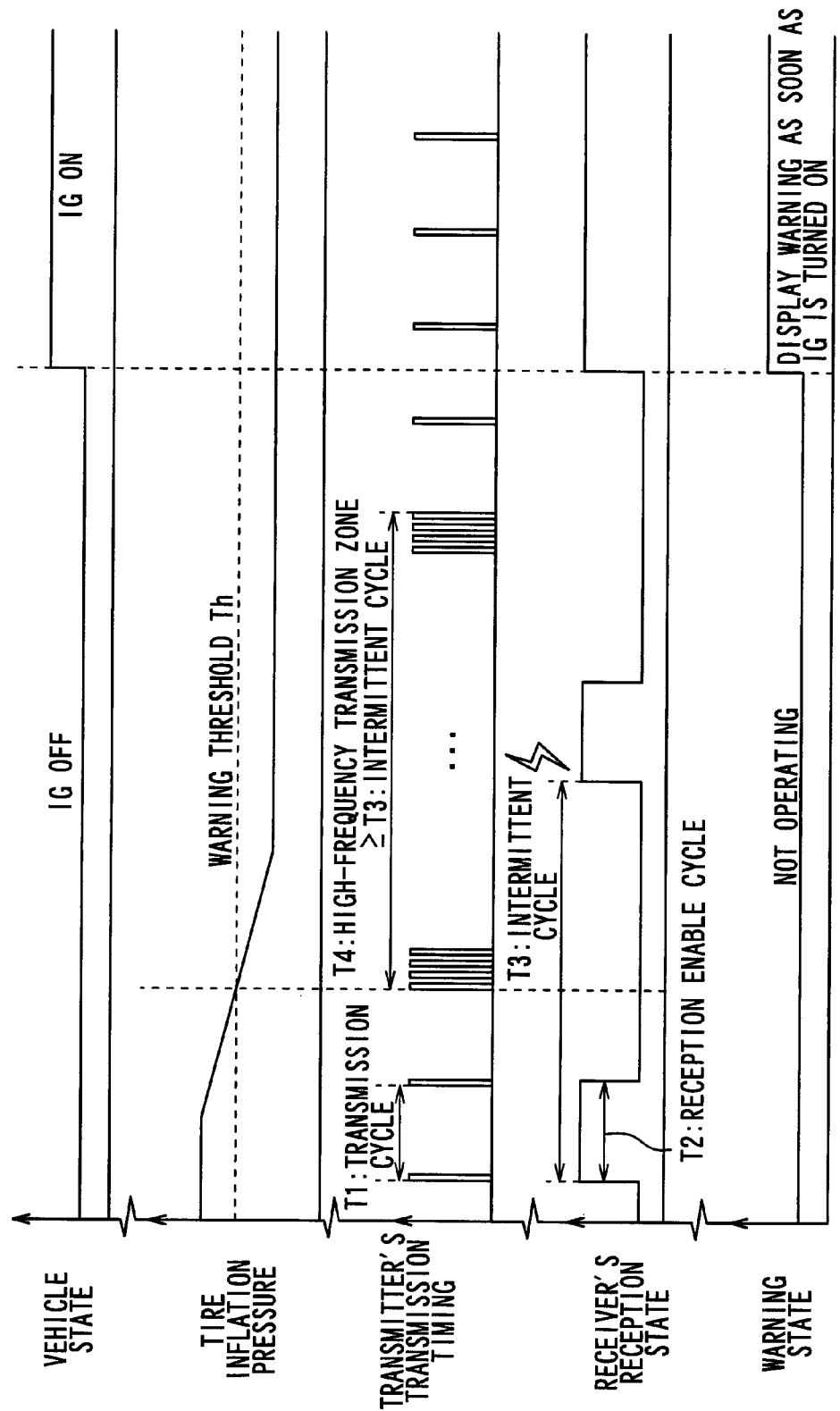
FIG. 8 is a time chart showing a state while an IG 9 is OFF and when the IG 9 is switched ON from OFF in a case where a tire inflation pressure detection of a third embodiment is performed.

In order to eliminate such an inconvenience, the present embodiment is configured so as to set a reception enable period T2 to a time as long as or longer than a regular transmission cycle T1 of frames plus a frame length T6 of one frame (T2≥T1+T6). In other words, as is shown in FIG. 8, in a normal regular transmission in the absence of the occurrence of a decrease of the tire inflation pressure, frames are transmitted from transmitters 2a through 2d in every regular transmission cycle T1. Hence, by setting the reception enable period T2 to a time as long as or longer than the regular transmission cycle T1 plus the frame length T6 (T1+T6), the entire period of the frame length T6 is contained within the reception enable period T2 at least once without fail even when the frames are transmitted as a normal regular transmission. Hence, when the frames are transmitted independently of whether the occurrence of a decrease of the tire inflation pressure is detected by the transmitters 2a through 2d while an IG 9 is OFF, the frames can be received at a receiver 3 in a reliable manner.

Fourth Embodiment

A fourth embodiment of the present disclosure will be described. The present embodiment is configured so as to address a case where a tire inflation pressure is adjusted while an IG 9 is OFF after a decrease of the tire inflation pressure is detected while a vehicle is stopped as in the first through third embodiments above. Because the rest is the same as the first through third embodiments above, a description will be given only to a difference from the first embodiment above.

As in the first through third embodiments above, when a decrease of the tire inflation pressure is detected while the vehicle is stopped, frames are transmitted at a short frame transmission interval during a high-frequency transmission zone T4 as an abnormal-time transmission. However, after a decrease of the tire inflation pressure is detected while the vehicle is stopped, the tire inflation pressure may be restored to a normal state because the tire inflation pressure is adjusted while the IG 9 is OFF. In such a case, it is not preferable to display a warning on a decrease of the tire inflation pressure when the IG 9 is turned ON.

Figure 9:
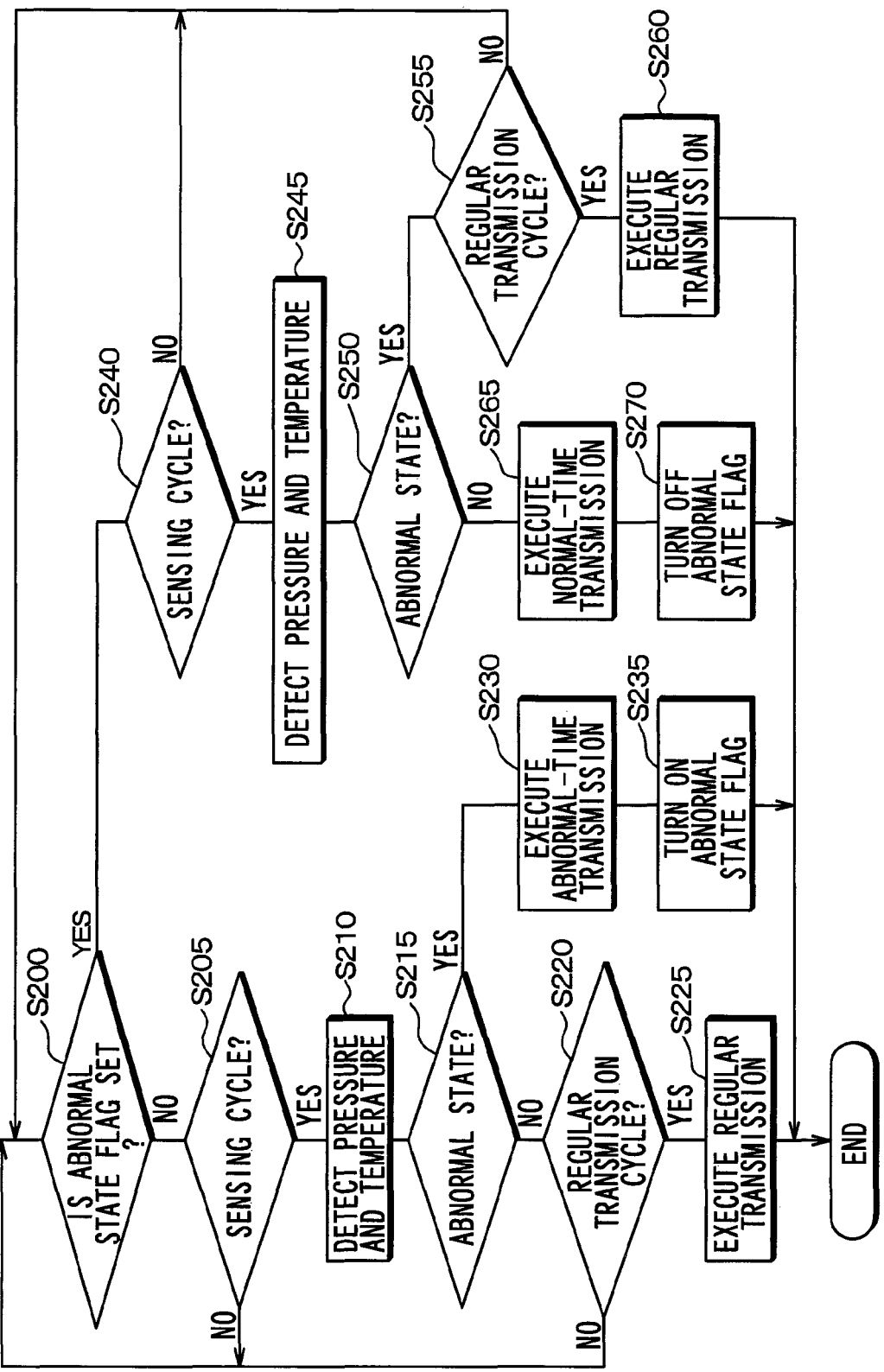
FIG. 9 is a flowchart depicting frame transmission processing described in a fourth embodiment of the present disclosure.

In order to eliminate such an inconvenience, the present embodiment is configured in such a manner that when the tire inflation pressure is restored to a normal state after a decrease of the tire inflation pressure is detected while the vehicle is stopped, a warning on a decrease of the tire inflation pressure is prevented from being displayed erroneously. More specifically, processing in accordance with the flowchart shown in FIG. 9 is performed instead of the flowchart shown in FIG. 4 and described in the first embodiment above.

Firstly in Step 200, a determination is made as to whether an abnormal state flag is set. The abnormal state flag is a flag that is set when an abnormal state is determined in Step 215 described below. A state before the abnormal state flag is set is a state in which a decrease of the tire inflation pressure is not detected while the vehicle is stopped. Hence, advancement is made to processing in Step 205 and subsequent steps and processing is performed in Steps 205 through 230 in the same manner as, respectively, in Steps 100 through 150 shown in FIG. 4. After an abnormal-time transmission is performed in Step 230, advancement is made to Step 235, in which the abnormal state flag is set. In the manner as above, a normal regular transmission is performed unless a decrease of the tire inflation pressure is detected while the vehicle is stopped and the abnormal-time transmission is performed upon detection of a decrease of the tire inflation pressure.

On the other hand, when a determination of YES is made in Step 200 because a decrease of the tire inflation pressure is detected while the vehicle is stopped, advancement is made to processing in Step 240 and subsequent steps. Processing is performed in Steps 240 through 250 in the same manner as in Steps 205 through 215, respectively. Herein, a determination is made in Step 250 whether it is an abnormal state as in Step 215. However, when the tire inflation pressure is restored to a normal state because the user adjusts the tire inflation pressure, it is determined that it is not the abnormal state.

When it is determined in Step 250 that it is the abnormal state, because the abnormal-time transmission is already performed in Step 230, a determination is made in Step 255 as to whether it is a regular transmission cycle. When it is the regular transmission cycle, advancement is made to Step 260, in which frames are transmitted as a normal regular transmission. In other words, even when it is the abnormal state, because the abnormal state is already notified to a receiver 3 by transmitting the frames in short transmission cycles, the normal regular transmission is performed without notifying the abnormal state again. Consequently, an increase of a dark current while the vehicle is stopped, which is caused by transmitting the frames in short transmission cycles each time the abnormal state is detected, can be restricted.

When a determination of NO is made in Step 250, because the user adjusted the tire inflation pressure and the tire inflation pressure has been restored to a normal state, advancement is made to Step 265, in which a normal-time transmission is performed. In other words, frames in which the data relating to the tire inflation pressure is stored are transmitted at a high frequency in transmission cycles shorter than the cycles of the regular transmission. Consequently, the receiver 3 is notified that the tire inflation pressure is restored to a normal state. Advancement is then made to Step 270, in which the processing is ended after the abnormal state flag is turned OFF.

Figure 10:
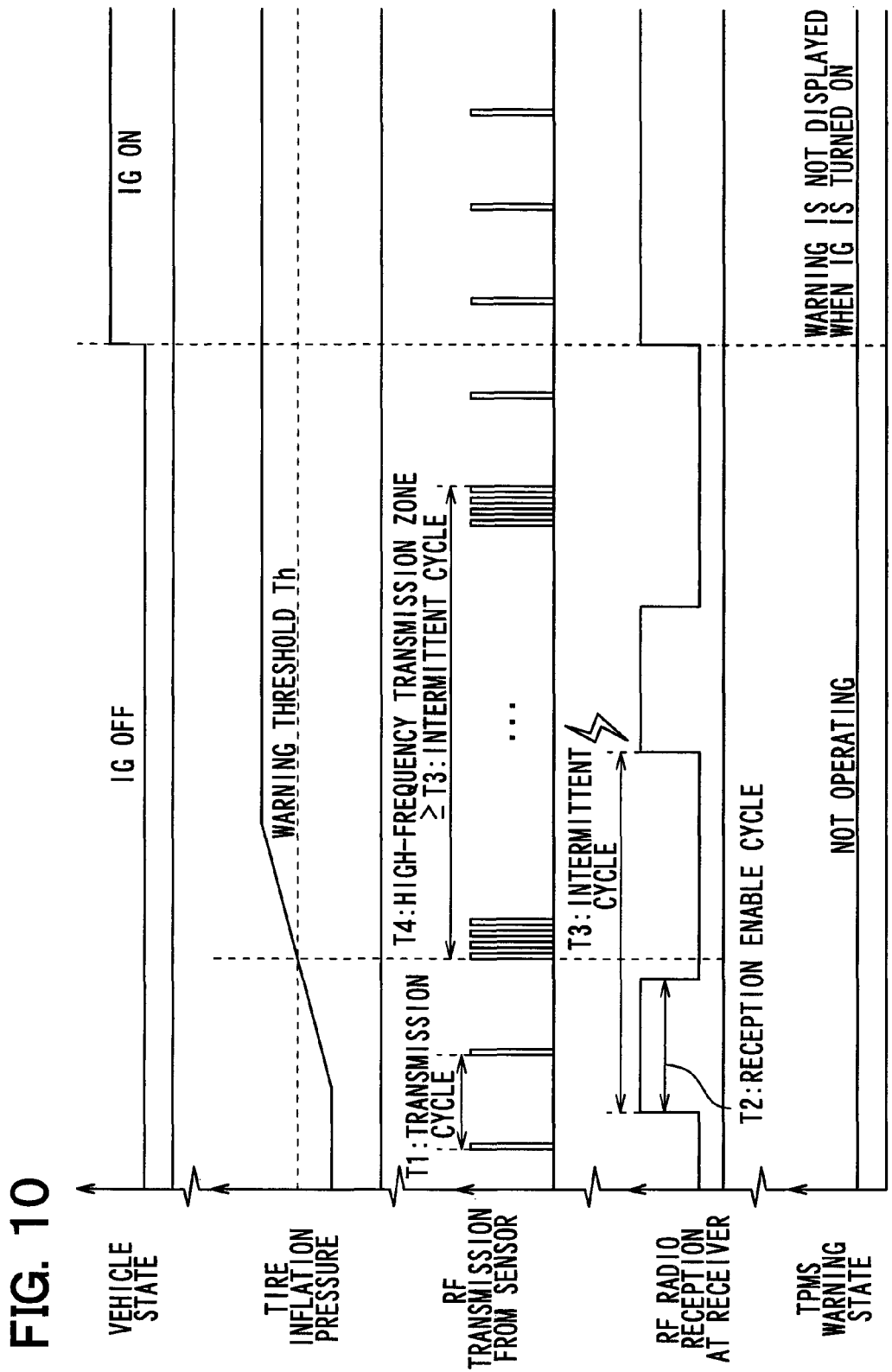
FIG. 10 is a time chart showing a state while an IG 9 is OFF and when the IG 9 is switched ON from OFF in a case where a tire inflation pressure detection of the fourth embodiment is performed.

FIG. 10 shows a state when the operation as above is performed. As is shown in FIG. 10, while the IG 9 is OFF, the frames are transmitted from transmitters 2a through 2d in every regular transmission cycle T1 and the receiver 3 is activated in every intermittent cycle T3 and becomes capable of receiving the frames during a reception enable period T2. Herein, because the regular transmission cycle T1 is made shorter than the reception enable period T2, the frames can be received during the reception enable period T2 in a reliable manner.

When the tire inflation pressure in a decreased state increases to or above a warning threshold Th again and has been restored to a normal state, the transmitters 2a through 2d detect that the tire inflation pressure is restored to the normal state and transmit the frames at a short frame transmission interval during the high-frequency transmission zone T4 as a normal-time transmission. Herein, by setting the high-frequency transmission zone T4 to a period longer than the intermittent cycle T3 in which to activate the receiver 3, the high-frequency transmission zone T4 and the reception enable period T2 overlap in terms of time. Hence, the frames transmitted during the high-frequency transmission zone T4 are received at the receiver 3 without fail. In the receiver 3, a controller 34 erases a history of the occurrence of a decrease of the tire inflation pressure stored in the memory.

Accordingly, even when the IG 9 is turned ON later and the receiver 3 is activated, because the history of the occurrence of a decrease of the tire inflation pressure is erased in the controller 34, a warning on the occurrence of a decrease of the tire inflation pressure is not displayed.

As has been described above, after the abnormal state due to the occurrence of a decrease of the tire inflation pressure is notified to the receiver 3 by the abnormal-time transmission, the transmission is returned to the normal regular transmission. When a normal state is restored later, the normal-time transmission is performed to notify the receiver 3 that a normal state is restored using the same transmission method as the abnormal-time transmission.

Consequently, when the tire inflation pressure is restored to a normal state by adjustment of the tire inflation pressure while the IG 9 is OFF after the occurrence of a decrease of the tire inflation pressure, a warning on a decrease of the tire inflation pressure can be prevented from being displayed erroneously.

(Modifications)

The present disclosure is not limited to the embodiments above and can be changed as needed within the scope of the appended claims.

For example, in the embodiments above, in a case where the occurrence of a decrease of the tire inflation pressure is detected while the IG 9 is OFF, a decrease of the tire inflation pressure is notified via the indicator 4 when the IG 9 is switched ON from OFF. Alternatively, a decrease of the tire inflation pressure may be notified under other circumstances where the driver is expected to use the vehicle. For example, it may be configured in such a manner that a door control ECU inputs a signal informing that the door is opened into the receiver 3 and a decrease of the tire inflation pressure is notified upon input of such a signal. Likewise, it may be configured in such a manner that an ECU controlling a remote key entry system inputs a signal informing that the door is unlocked by a remote key and a decrease of the tire inflation pressure is notified upon input of such a signal. Further, it may be configured in such a manner that an ECU controlling a smart entry system inputs a signal informing that the driver is coming toward the vehicle and a decrease of the tire inflation pressure is notified upon input of such a signal.

Also, in the embodiments above, when a decrease of the tire inflation pressure is detected, data indicating a decrease of the tire inflation pressure is stored into the frames in which data indicating the tire inflation pressure is stored, and the frames are transmitted to the receiver 3. Alternatively, it may be configured in such a manner that data indicating a decrease of the tire inflation pressure is stored into a separate frame different from the frames in which data indicating the tire inflation pressure is stored, and the separate frame and the frame in which the data indicating the tire inflation pressure is stored are transmitted to the receiver side simultaneously or at different timings.

Also, in the embodiments above, because whether the IG 9 is turned ON is unknown to the transmitters 2a through 2d, the abnormal-time transmission is performed independently of whether the IG 9 is ON or OFF when the abnormal state is determined upon detection of a decrease of the tire inflation pressure. Alternatively, in a case where a rotation detection portion capable of detecting a tire rotation state, such as an acceleration sensor, is provided to the respective transmitters 2a through 2d, it may be configured in such a manner that the abnormal-time transmission is performed only when a decrease of the tire inflation pressure is detected while the tire is not rotating. In the fourth embodiment above, the normal-time transmission is performed when the tire inflation pressure is restored to a normal state after the detection of a decrease of the tire inflation pressure. This configuration may be changed as follows in a case where the rotation detection portion is provided. That is, it may be configured in such a manner that the normal-time transmission is performed only when the tire inflation pressure is restored to a normal state without a history of rotation of the tire after a decrease of the tire inflation pressure.

In the embodiments above, when a decrease of the tire inflation pressure is detected while the IG 9 is OFF, a signal informing a decrease of the tire inflation pressure is transmitted to the receiver 3 for the receiver 3 to store the occurrence of a decrease of the tire inflation pressure, so that a decrease of the tire inflation pressure can be notified promptly. However, as described in the fourth embodiment above, it is not preferable to notify a decrease of the tire inflation pressure when the tire is filled with air while the vehicle is stopped. Hence, even in a case where once the occurrence of a decrease of the tire inflation pressure is stored in the receiver 3, it is preferable to erase the stored content on the occurrence of a decrease of the tire inflation pressure when it is confirmed that the tire inflation pressure is restored to a normal state based on the data relating to the tire inflation pressure received later. For example, even in a case where the normal-time transmission as in the fourth embodiment is not performed when the tire inflation pressure is restored to a normal state, timing at which the receiver 3 changes to the reception stand-by state while the IG 9 is OFF and timing of the normal regular transmission may coincide with each other. In such a case, because it can be confirmed that the tire inflation pressure has been restored to a normal state on the side of the receiver 3, it is preferable to erase the stored content on the occurrence of a decrease of the tire inflation pressure.

Further, in a case where the normal-time transmission is performed as in the fourth embodiment above, by establishing relations, T2≥T5+T6 and T2≥T1+T6, as in the second and third embodiments above, respectively, advantageous effects same as those of the second and third embodiments above can be also achieved.

The invention claimed is:

1. A tire inflation pressure detection device, comprising:
a plurality of transmitters correspondingly provided to a plurality of wheels which are respectively equipped with a tire, and each of the plurality of transmitters having:
a sensor that outputs a detection signal relating to a tire inflation pressure of each corresponding wheel,
a first controller that forms data relating to the tire inflation pressure by applying signal processing to the detection signal of the sensor and creates a frame in which the data is stored, and
a radio transmitter that transmits the frame in a predetermined regular transmission cycle; and
a receiver provided to a vehicle body side, and having:
a radio receptor that receives the frame,
a power-supply controller that controls a power supply to enable a reception of the frame at the radio receptor, and
a second controller that detects an occurrence of a decrease of the tire inflation pressure based on the data relating to the tire inflation pressure stored in the frame which is received, wherein:
the receiver operates on a supply of power from a battery and detects the tire inflation pressure while an ignition switch is in an on state by generating the power supply to enable the reception of the frame at the radio receptor using the power-supply controller to change a power-supply state of the receiver to a state in which the receiver is enabled to receive the frame, and detects the tire inflation pressure while the ignition switch is in an off state by generating the power supply to enable the reception of the frame at the radio receptor using the power-supply controller in every predetermined intermittent cycle to change the power-supply state of the receiver to the state in which the receiver is enabled to receive the frame;
each of the plurality of transmitters determines based on the detection signal of the sensor whether a decrease of the tire inflation pressure occurs, and transmits, when a decrease of the tire inflation pressure occurs, the frame at a frame transmission time interval less than the regular transmission cycle during a high-frequency transmission zone set to be greater than or equal to the predetermined intermittent cycle at a frequency higher than a frequency before a decrease of the tire inflation pressure occurs; and the predetermined regular transmission cycle is set to be shorter than a reception enable cycle during which the receiver changes the power-supply state of the receiver to the state in which the receiver is enabled to receive the frame in the every intermittent cycle.

2. The tire inflation pressure detection device according to claim 1, wherein:

the reception enable cycle is set to be greater than or equal to a total of a frame transmission time interval of the transmitters during the high-frequency transmission zone and a frame time length of one frame.

3. The tire inflation pressure detection device according to claim 2, wherein:

the reception enable cycle is set to be greater than or equal to the predetermined regular transmission cycle plus the frame time length of one frame.

4. The tire inflation pressure detection device according to claim 1, wherein:

each of the plurality of transmitters determines whether the tire inflation pressure is restored to a normal state from a decreased state based on the detection signal of the sensor, and transmits, when the tire inflation pressure is restored to the normal state, the frame at the frame transmission time interval less than the regular transmission cycle during the high-frequency transmission zone set to be greater than or equal to the intermittent cycle at a frequency higher than a frequency before a decrease of the tire pressure occurs.

5. The tire inflation pressure detection device according to claim 1, further comprising:

a warning device for a warning on the decrease of the tire inflation pressure upon detection of the decrease of the tire inflation pressure in the receiver, wherein the receiver stores, upon the detection of the decrease of the tire inflation pressure while the ignition switch is in an off state, a record of the detection of the decrease of the tire inflation pressure, and gives a warning on the decrease of the tire inflation pressure based on the record through the warning device when a driver uses a vehicle.

6. The tire inflation pressure detection device according to claim 4, further comprising:

a warning device for giving a warning on the decrease of the tire inflation pressure upon detection of the decrease of the tire inflation pressure in the receiver, wherein the receiver stores, upon the detection of the decrease of the tire inflation pressure while the ignition switch is in an off state, a record of the detection of the decrease of the tire inflation pressure, and gives a warning on the decrease of the tire inflation pressure based on the record through the warning device when a driver uses a vehicle, and stops giving the warning on the decrease of the tire inflation pressure by erasing the record when the tire inflation pressure is restored to a normal state from a decreased state while the ignition switch is in an off state.

* * * * *